(12) United States Patent
Anton-Becker

(10) Patent No.: US 7,676,202 B2
(45) Date of Patent: Mar. 9, 2010

(54) RADIO SYSTEM

(75) Inventor: Karl Anton-Becker, Karlsbad (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 416 days.

(21) Appl. No.: 11/280,968

(22) Filed: Nov. 15, 2005

(65) Prior Publication Data

US 2007/0129020 A1    Jun. 7, 2007

(30) Foreign Application Priority Data

Nov. 15, 2004    (EP) .................................. 04027112

(51) Int. Cl.
*H04B 17/02* (2006.01)
*H04B 1/06* (2006.01)
(52) U.S. Cl. ..................... 455/133; 455/277.1; 455/280
(58) Field of Classification Search ................. 455/132, 455/133, 134, 135, 136, 269, 272, 277.1, 455/277.2, 280, 12.1, 427, 456.1
See application file for complete search history.

(56) References Cited

U.S. PATENT DOCUMENTS 4,656,364 A * 4/1987 Yokogawa et al. ....... 455/277.1
4,823,398 A * 4/1989 Hashimoto .................. 455/134
4,939,791 A   7/1990 Bochmann et al. .......... 455/276
5,159,707 A * 10/1992 Mogi et al. .................. 455/134
5,239,541 A * 8/1993 Murai ..................... 455/277.2
5,313,660 A * 5/1994 Lindenmeier et al. ........ 455/135
5,697,075 A * 12/1997 Kim ........................... 455/133
7,149,489 B2 * 12/2006 Hong .......................... 455/269
2001/0016478 A1   8/2001 Lindenmeier et al. ..... 455/277.1

FOREIGN PATENT DOCUMENTS

| | | |
|---|---|---|
| DE | 19848360 | 4/2000 |
| EP | 0333194 A2 | 3/1989 |
| EP | 1045531 A2 | 4/2000 |
| EP | 1370016 A1 | 6/2002 |
| EP | 1045531 A3 | 7/2003 |
| KR | 100136052 B1 | 1/1998 |
| WO | WO03/058847 A1 | 7/2003 |

\* cited by examiner

*Primary Examiner*—Quochien B Vuong
(74) *Attorney, Agent, or Firm*—The Eclipse Group LLP

(57) ABSTRACT

A radio system for the reception of broadcast signals is provided that includes two antennas picking up radio signals and two signal receivers receiving the radio signals, the two antennas and the two receivers operating in diversity operating modes. The radio system further includes an antenna switching unit for creating a connection between the receivers and the antennas and a control unit for controlling the antenna switching unit and selecting the operating mode according to predetermined diversity control criterion.

14 Claims, 6 Drawing Sheets

RADIO SYSTEM

CROSS REFERENCE TO RELATED APPLICATIONS

This application claims priority to European Patent Application Serial No. 04 027 112.4, filed Nov. 15, 2004, titled RADIO SYSTEM AND METHOD FOR CONTROLLING A RADIO SYSTEM, which is incorporated by reference in this application in its entirety.

BACKGROUND OF INVENTION

1. Field of the Invention

The invention relates to a radio system for receiving and controlling the reception of broadcast signals, and in particular, a radio system capable of controlling the reception for broadcast signals for use with a vehicle navigation system.

2. Background of the Invention

Nowadays, vehicle navigation systems are often combined with radio systems and form one single head unit used for guiding the driver of a vehicle to a predetermined destination and for functioning as an entertainment system for audio applications. Vehicle radio systems often use reception systems that use multiple antennas for receiving radio signals. When multiple antennas or multiple receivers are used, antenna diversity operating modus or frequency diversity operating modes are also used. Antenna diversity operating system and frequency diversity operating modes are known in the art.

When using antenna diversity operation mode, multiple spatially separated antennas are used to receive radio signals. When the radio system operates in antenna diversity operating mode, the receiver system selects one of the antennas as the source for radio signal processing based on predefined criteria. Such criterion may be, e.g., the received signal strength, interference or noise level, signal-to-noise ratio or other signal quality criteria.

When using frequency diversity operating mode, the radio system includes multiple radio receivers. One of the radio receivers may function as an operating receiver and another receiver may function as a search and check receiver. The operating receiver stays tuned to the frequency of interest to receive and process the received radio signal. Simultaneously, the search and check receiver searches for alternative reception frequencies (AFs) that may provide higher signal quality. If the search and check receiver finds another reception frequency providing higher signal quality, either the operating receiver tunes to the alternate reception frequency or the search and check receiver and the operating receiver switch roles.

Alternatively, antenna phase diversity mode is also known to operate in a system in which a first receiver coupled to a first antenna and a second receiver coupled to a second antenna are tuned to the same frequency. After a phase correction of one of the signals, the two signals are summed to achieve a better signal for further processing the received radio signal. A phase-corrected summation of the signals is described, inter alia, in DE 101 02 616 A1.

Furthermore, modern FM radio transmissions include several types of content. In most cases, the FM radio signal or a particular program is a multiplex signal that includes not only left and right channel audio content, but also data content. The data content may carry program information codes that indicate the name of the audio program, the name of the radio station broadcasting the FM radio signal and/or traffic information. The additional information data, especially traffic information, may be used by the navigation system when calculating a route from the current position to a predetermined destination. Using the traffic information, the navigation may take into account possible traffic congestions or closed routes when calculating the route. When the navigation system calculates a new route, it may need many additional items of information concerning traffic information for the calculated route. The possibility of collecting additional information data depends on the current operating mode of the radio system. In some applications it may be important to receive an optimal radio signal, in other situations it may be helpful to be able to collect as much additional information data as possible, e.g., traffic information.

Normally, one of the standard operating modes of a radio system can be used to achieve a high quality signal. However, when a radio system is operating in a moving vehicle, the operation of a radio system varies frequently due to constant changes in the surround environment. To collect useful data for use by a navigation system, the radio system must be able to not only account for the environmental and situation changes, but also operate in a large variety of modes. Thus, a need exists to provide a radio system having a large variety of operating modes and that is able to adjust operating modes based on different driving situations occurring in a moving vehicle.

SUMMARY

A radio system is provided for the reception of broadcast signals comprising two antennas for picking up radio signals and two signal receivers receiving radio signals and operating in diversity operating mode. The system also includes an antenna switching unit for building a connection between the receivers and the antennas, and a control unit for controlling the antenna switching unit and selecting the operating mode according to predetermined diversity control criterion.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

DETAILED DESCRIPTION

A multi-mode radio system is provided that operates in the optimum operating mode given the circumstances. A first hybrid mode may be used when the received program is broadcast on different receiving frequencies. The search and check receiver can search for alternate reception frequencies that have a higher signal quality. Furthermore, as described in more detail below, the second receiver working as a search and check receiver can search for additional information data comprised in the broadcast signals. The search and check receiver can look for digital add-on data having, e.g., the RDS format (Radio Data System) or DARC (Mobile FM Multiplex Broadcast). In addition to news or the name of the received radio station, the RDS data comprise traffic information (TMC), which can be used by a navigation system, as described in more detail below. When the signal quality of the received signal is important or weak, the radio system may work in the antenna phase diversity mode in which both receivers are tuned to a same frequency, the two signals being summed up after a phase correction. When the program of the radio station is broadcast only on one frequency, and when there is no need for information data, the radio system may choose to operate in the antenna phase diversity mode. Further, the radio system may also be able to work in the system diversity mode. Some programs are broadcast via FM, AM or digital radio systems, e.g., DAB (Digital Audio Broadcasting) or DRM (Digital Radio Mondiale). When it is noticed that a program of a radio station is also broadcast via DAB or another digital radio system, a digital radio receiver may be used instead of the analogue receiver. The radio system can always choose either the analogously broadcast signal or the digitally broadcast signal in dependence on the signal quality of the two received signals. Furthermore, the radio system may select the dual play mode in which the two receivers receive different radio programs on different frequencies for different users in the vehicle.

Figure 1:
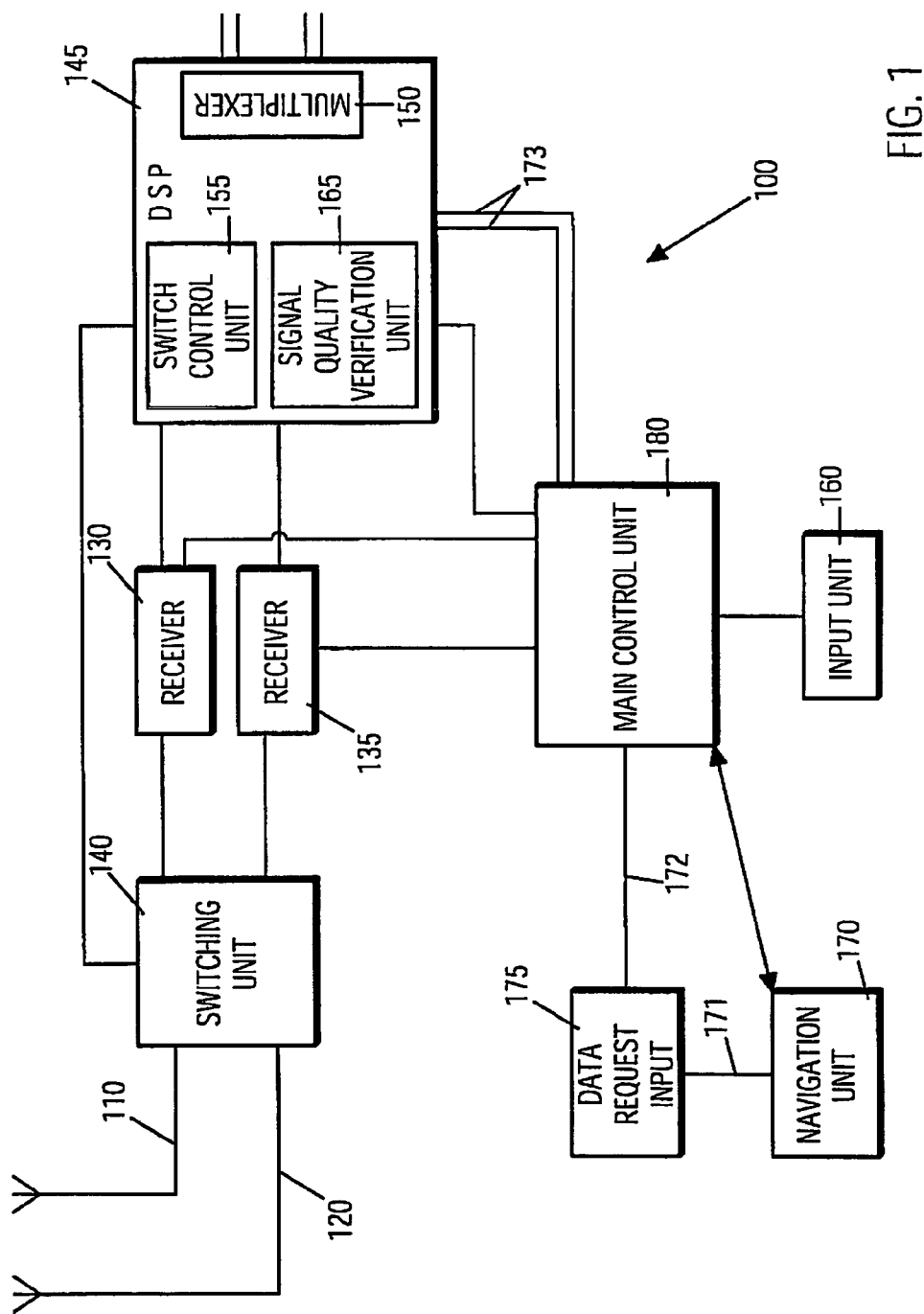
FIG. 1 illustrates a block diagram of an example of a radio receiver that can work in different operating modes according to predetermined criteria.

FIG. 1 shows one example of a radio system incorporating features of the invention. In FIG. 1, the radio system 100 comprises two antennas 110, 120 picking up radio signals. When used in a vehicle, the two antennas 110, 120 may be incorporated into different parts of a vehicle. For example, the first antenna 110 may be arranged on the top of the vehicle roof and the other antenna 120 may be incorporated into any other part of the vehicle. It should be understood that the radio system may also comprise more than two antennas, e.g., three or four.

The system also includes two receivers 130, 135 and a switching unit 140 to build a connection between the antennas 110, 120 and the two receivers 130, 135. Before the signals are received from the two receivers 130, 135, the switching unit 140 is connected between the antennas 110, 120 and the receivers 130, 135. The switching unit 140 switches the signals picked up by the antennas 110, 120 or by one of the antennas to either or both of the receivers 130, 135. The received signals are then transmitted to a digital signal processor DSP 145. The DSP comprises a multiplexer 150, a switch control unit 155 and a signal verification unit 165. The way of processing an FM radio signal received by the receivers 130 and 135 and of extracting the program content that the user hears is well known in the art and is, therefore, not described in detail.

The DSP 145 further comprises the signal quality verification unit 165. The signal quality verification unit receives the signals from the receivers 130, 135 and checks the signal quality of the received signals. Unit 165 may determine the received signal strength, the interference or noise level, the signal-to-noise ratio or any other signal quality criteria for each of the received signals. The switch control unit 155 may further be connected to the receivers 130, 135 to select the operating mode of the receivers.

To control the switching unit 140, a main control unit 180 is provided that controls the functioning of the DSP 145 and of the radio system 100. The control unit 180 is connected to the DSP 145 and is connected to an input unit 160 that a driver or end user may use to input desired operating modes of the radio system 100. The radio system 100 may operate in several different modes that may be selected by the user via the input unit 160: (i) a hybrid mode; (ii) an antenna phase diversity mode; (iii) a system diversity mode; and/or (iv) a dual play mode.

In the hybrid mode, the first receiver 130 works in a scanning antenna diversity mode as an operating receiver and one of the antennas 110, 120 is selected as the source of radio signals for processing. The second receiver 135 works as a search and check receiver in a frequency diversity mode. In this case, the operating receiver normally selects the antenna picking up signals with a better quality, whiles the second receiver, as a search and check receiver, may use either the same antenna as the operating receiver or another antenna.

In the antenna phase diversity mode, the first receiver uses one antenna and the second receiver using another antenna. Both receivers are tuned to the same frequency for a phase controlled summation of the two received signals. This antenna phase diversity mode may be used when the chosen program can only be received on one frequency and when good signal quality is important.

In the system diversity mode, the first receiver comprises a digital radio receiver receiving digitally broadcast radio signals (e.g. DAB or DRM). The second receiver is an analogue receiver receiving analogously broadcast radio signals. In some geographic regions the radio programs are simultaneously broadcast by digitally broadcast radio signals and by analogously broadcast radio signals. When the signal quality of the received analogously broadcast radio signal is poor, the system may switch to the digital radio receiver receiving the digitally broadcast radio signals.

In the dual play mode, the first receiver receives a first program on a first frequency and the second receiver receives another program on another frequency. The dual play mode can be used when the passengers in the front want to hear a first radio program, and the passenger in the back may use the rear seat entertainment system to hear another program (e.g., using headphones to hear the other program).

As further illustrated by FIG. 1, the radio system 100 may interface with a navigation unit 170. When a navigation unit 170 (in which the radio system 100 of FIG. 1 may be incorporated into or interfaced with) guides a driver of a vehicle to a certain destination, the navigation unit 170 calculates the best route to a predetermined destination. To calculate the best route, the navigation unit 170 may consider additional information, e.g., traffic information, when performing its calculation. When such additional information is desired by the navigation system 170, an information data request signal is transmitted from the navigation system 170 via connection 171 to a data request input 175. The data request input 175 transmits the information data request signal to the control unit 180 of the radio system via connection 172. The control unit 180 processes the received signal and transmits the information of the data request signal to DSP 145. The switch control unit 155 controls the switching unit and the two receivers 130, 135 in such a way that the radio system 100 works in the hybrid mode, in which one of the receivers (e.g. 130) works in a scanning antenna diversity mode as an operating receiver and one antenna 110 is selected as the source of radio signals for processing. A second receiver 135 works as a search and check receiver in a frequency diversity mode, selecting the antennas 110 or 120 for scanning the frequency band. The search and check receiver 135 searches for information data comprised in the received radio signals. In the DSP 145, the received radio signals including digital add-on data comprising the information data needed by the navigation system 170 are decoded and transmitted via connection 173 to the control unit 180 which transmits the data to the navigation unit 170. The information data may, for example, comprise the RDS signals comprised in the broadcast radio signals.

A signal quality verification unit 165 may verify the received signals, and when the signal quality of the received signals is poor or when a program that the driver of the vehicle wants to hear is only broadcast on one frequency, the signal quality verification unit 165 may transmit the result to the switch control unit 155, the latter controlling the switching unit 140 and the receivers 130, 135 in such a way that the antenna phase diversity mode is selected.

It should be understood that the navigation unit 170 comprises many other features needed to provide a full guiding system to the driver. Navigation systems a well known in the art, thus, a detailed description of the navigation unit 170 is omitted, as it is not necessary to understand the invention.

Figure 2:
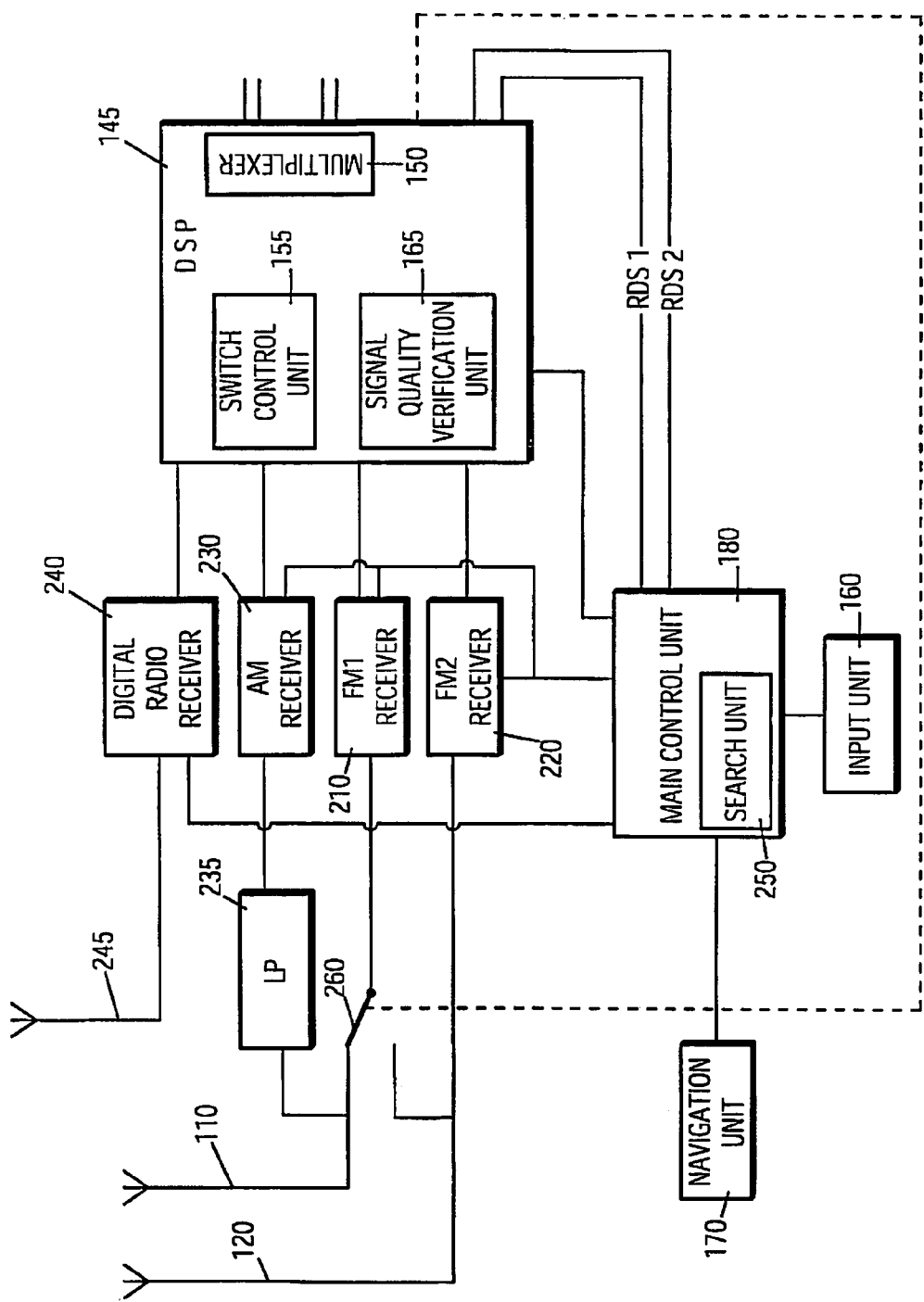
FIG. 2 illustrates another example of a radio receiver capable of choosing to operate in either a hybrid mode or an antenna phase diversity mode.

FIG. 2 is another example of another radio system that is able to operate in different operating modes. Features explained in connection with the radio system 100 illustrated in FIG. 1 that are the same as the radio system illustrated in FIG. 2 are represented by the same reference numerals as the radio system 100 of FIG. 1. As illustrated in FIG. 2, the radio system includes two FM receivers 210 and 220. The radio system also includes an AM receiver 230 for receiving LW, MW and SW signals. Furthermore, a low pass filter 235 is connected between the antenna 110 and the AM receiver 230 for filtering out high frequencies. A digital radio receiver 240 is connected to an antenna 245 that is able to pick up digitally broadcast radio signals. A search unit 250 is provided in a control unit 280 to check whether digitally broadcast signals can be received. In the example in FIG. 2, the switching unit 140 shown in FIG. 1 is a switch 260, which connects the receiver 210 either to the first antenna 110 or to the second antenna 120. In the illustrated example, the switch 260 connects the antenna 110 to the first receiver 210, while the second receiver 220 is connected to the second antenna 120. In this connection state, a radio system could work in the hybrid mode in which the first receiver 210 works as operating receiver, while the second receiver 220 works as search and scan receiver connecting the additional data needed for the navigation unit 170. The digital information data are decoded in the DSP 145, and the RDS data (RDS1, RDS2) are transmitted to the navigation unit 170 via the control unit 280. The navigation unit 170, in turn, may use the received information data for calculating a route taking into consideration traffic information comprised in the digital information data. In the hybrid mode, the operating receiver will select the antenna having the better signal quality, i.e., the operating receiver 210 will either select antenna 110 or 120 and the switch 260 will be operated accordingly. In the illustrated example, the search and scan receiver 220 uses antenna 120 to scan the frequency band. The radio system can also work in the antenna phase diversity mode in which receiver 210 is connected to antenna 110, receiver 220 is connected to antenna 120 and both receivers 210, 220 are tuned to have the same frequency, the signal from receiver 210 being added to the signal of receiver 220, so that a better signal-to-noise ratio can be obtained.

The switch 260 is controlled by the switch control unit 155, which receives information from control unit 280 as to how to position the switch 260. The switch 260 can also be switched to another configuration in which it connects the receiver 210 to the antenna 120. In this case, the radio system can also work in the hybrid mode in which the first receiver 210 works as an operating receiver and the second receiver 220 uses the same antenna for scanning the frequency band. As can be seen from the example illustration in FIG. 2, the two receivers 210, 220, the at least two antennas 110, 120 and the switching control unit 155 provide a radio system that can either work in the antenna phase diversity mode, in which noise suppression plays an important role, or in the hybrid mode, in which one receiver 210 works as an operating receiver and the second receiver 220 collects information data for the navigation unit 170. In the hybrid mode, the receiver 210 still has the possibility of choosing one of the antennas 110, 120 and can, therefore, choose the antenna having the best signal quality. The receiver 210 has still the choice to select one of the antennas 110 or 120, the antenna being used that provides the best signal quality results.

Figure 3:
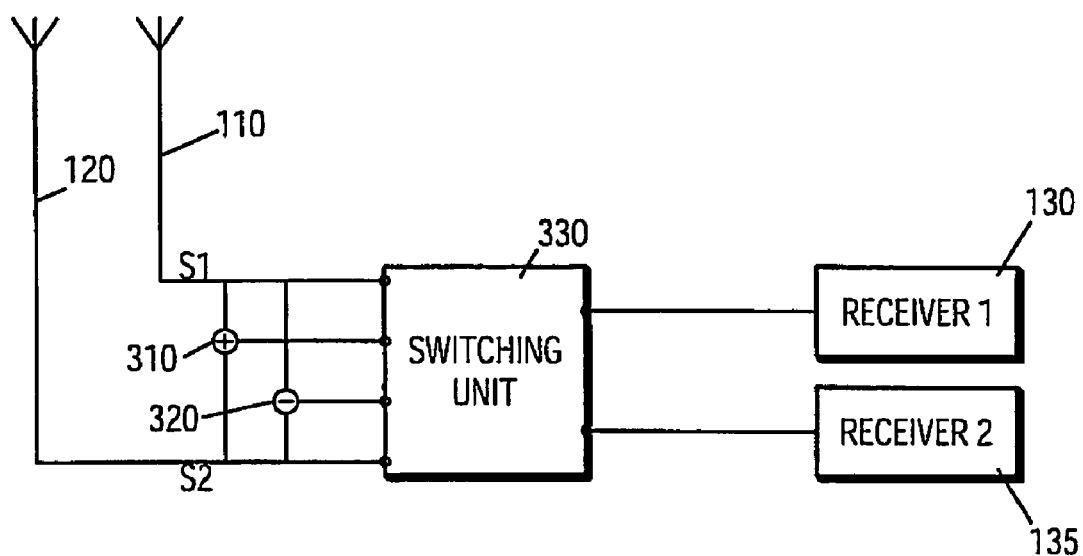
FIG. 3 illustrates an example of a multi-mode radio system.

FIG. 3 illustrates another example of a radio system. The example radio system in FIG. 3 may help eliminate reflections that come from a multi-pass reception of the radio signals. When the radio signal is not directly picked up from the antenna 110, 120, but is reflected from an obstacle before being picked up by the antenna 110, 120, the signal quality deteriorates.

To help eliminate reflections, the signal S1 received by antenna 110 is added to signal S2 received by antenna 120 in an adding unit 310. In a subtraction unit 320, signal S2 is deducted from signal S1, so that as a consequence, the switching unit 330 has four inputs receiving the signals S1, S1+S2, S1−S2, S2. These four signals can then be used to determine multi-pass signals in the received radio signals. When using the four signals, the reflected radio signals can be suppressed in an effective way, as it is easier to suppress multipath reflections with four signal characteristics than when the two signals S1+S2 are used alone.

In general, a radio system, such as the example radio systems illustrated in FIGS. 1 & 2, may control its operating mode using the follow example method. First, a first and second antenna and a first and second receiver are provided, the receivers receive radio signals and operate in diversity operating modes. Next, a diversity control criterion may be determined that can then, in a next step, be used for controlling the connection between the receivers and the antennas and that can be used for selecting the operating mode of the radio system. Accordingly, the radio system cannot only work in one operating mode, but can be run in many different operating modes in accordance with the predetermined criterion. Such different operating modes may include any one of the following operating modes, described above: (i) the hybrid mode, (ii) the antenna phase diversity mode, (iii) the system diversity mode or (iv) the dual play mode.

For selecting the operating mode, the signal quality of the received radio signals may be determined. Furthermore, a request for information data comprised in the radio signal may be determined in addition to, or instead of, the signal quality. The connection between the receivers and the antennas is controlled in such a way and the operating mode is selected in such a way that the operating mode is in accordance with the signal quality and/or in accordance with the request for information data. Either or both the signal quality or the request for information data can be determined, and the operating mode can then be determined in accordance with the two items of information. However, it is also possible that only the request for information data is determined and the operating mode is selected in accordance with the request for information data or the signal quality, and the operating mode is selected that provides the best signal quality.

Further, the antenna phase diversity mode may be selected, if the signal quality does not exceed a predetermined level. This means, when the signal quality is below a certain threshold value, the output signal after the processing and demodulating is optimized by choosing the antenna phase diversity mode. In this case, the antenna phase diversity mode may help to improve the signal by the summation of the phase corrected signals received by the two antennas. On the other hand, the hybrid mode can be selected, if a request for information data is detected. When the navigation system transmits a data request signal to the information data request input and the signal is transmitted to the control unit, the latter will select the hybrid mode for collecting additional information data.

The basic operating mode may be the antenna phase diversity mode when no data request can be detected. When an urgent data request is detected, the operating mode may be changed to the hybrid mode. However, it is also possible to choose the system diversity mode or the dual play mode as basic operating mode. Upon detection of a data request, the operating mode will change to the hybrid mode. If the operating mode is not the hybrid mode, the operating mode is changed to the hybrid mode, when a data request from the navigation system is detected.

Optionally, an end user can select the basic operating mode when no data request of the navigation system can be detected. Before starting the radio system or before starting the navigation system, the end user may have the possibility of choosing which priority operating mode he or she desires to use. If the end user desires to have best signal quality, he or she may select the antenna phase diversity mode as the basic operating mode. The end user may also choose the hybrid mode as priority for the operating mode so that the radio system preferably works in the hybrid mode, when priorities are set on the calculation of routes.

When the radio system works in the antenna phase diversity mode or any other possible operating mode and when an information data request signal is detected, the hybrid mode can be selected in which the search and check receiver scans the frequency band and searches for information data.

Additionally, a navigation system connected to the radio system may transmit an information data request signal to an information data request input, and the information data request input may transmit the signal to the control unit, which selects the operating mode in accordance with the information data request signal.

The radio system is not, however, limited to the two operating modes. The radio system may also be capable of detecting whether digitally broadcast radio signal can be received. The received signal quality of the analogously broadcast radio signal can then be determined and compared to the signal quality of the digitally broadcast radio signal, and the digitally broadcast radio signal or the analogously broadcast radio signal can be selected depending on the signal quality.

If the dual play mode is selected, a radio signal comprising a first program information received by the first receiver is transmitted to a first reproduction unit, and the radio signal comprising a second program information received by the second receiver is transmitted to a second reproduction unit. In this case, two different end users can hear two different radio programs.

When the radio system works in the hybrid mode, the second receiver can decode digital add-on data from the received analogue radio signals and extract, inter alia, the traffic information which the navigation system may use to calculate the best route to the predetermined destination.

Figure 4:
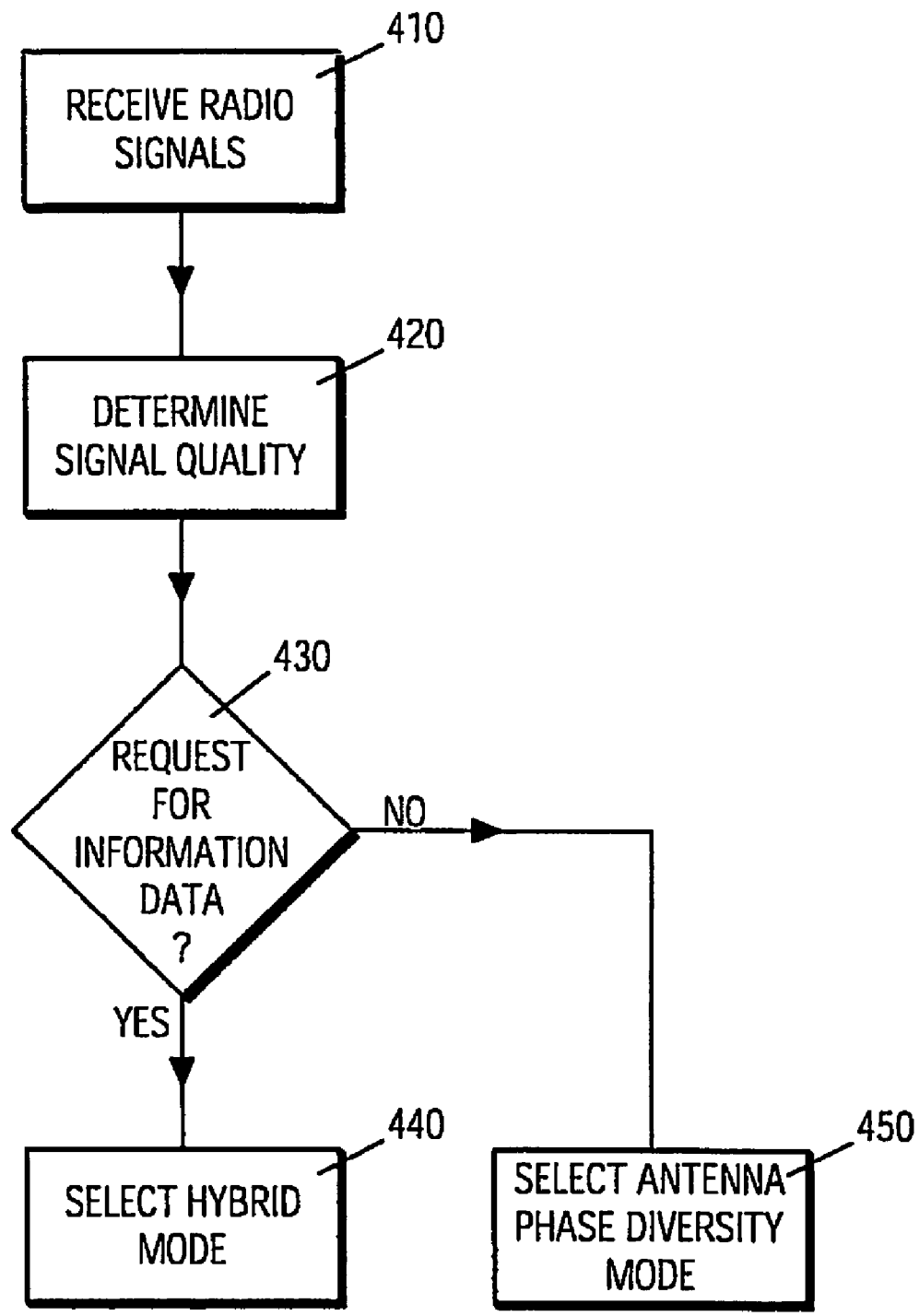
FIG. 4 illustrates a flowchart illustrating an example method for selecting a radio system operating mode.

FIG. 4 illustrates a flowchart showing an example of one method for selecting a radio system operating mode. In step 410, the radio signals are received using the antennas 110 and 120. In a second step 420, the signal quality is determined to know whether the received signal quality is good enough for the further processing of the received radio signals. In step 430, it is decided whether a request for information data is present on the data request input 175. If the navigation unit needs additional information data for calculating a route, the request signal is sent to the control unit. The control unit selects the hybrid mode as the operating mode of the radio system (step 440). If no request for information data can be detected, the antenna phase diversity mode may be selected as the operating mode of the radio system (step 450). Although FIG. 4 shows the antenna phase diversity mode being selected in step 450, any other operating mode can be selected in step 450. When no data request is present for additional information data, the radio system can work in any operating mode, but when an urgent data request from the navigation system is detected, the hybrid mode is selected and the second receiver scans the frequency band and collects additional information data. Furthermore, it is also possible to omit the determination of the signal quality in step 420. The operating mode can also be selected based only on the query as to whether information data has been requested by the navigation unit.

Figure 5:
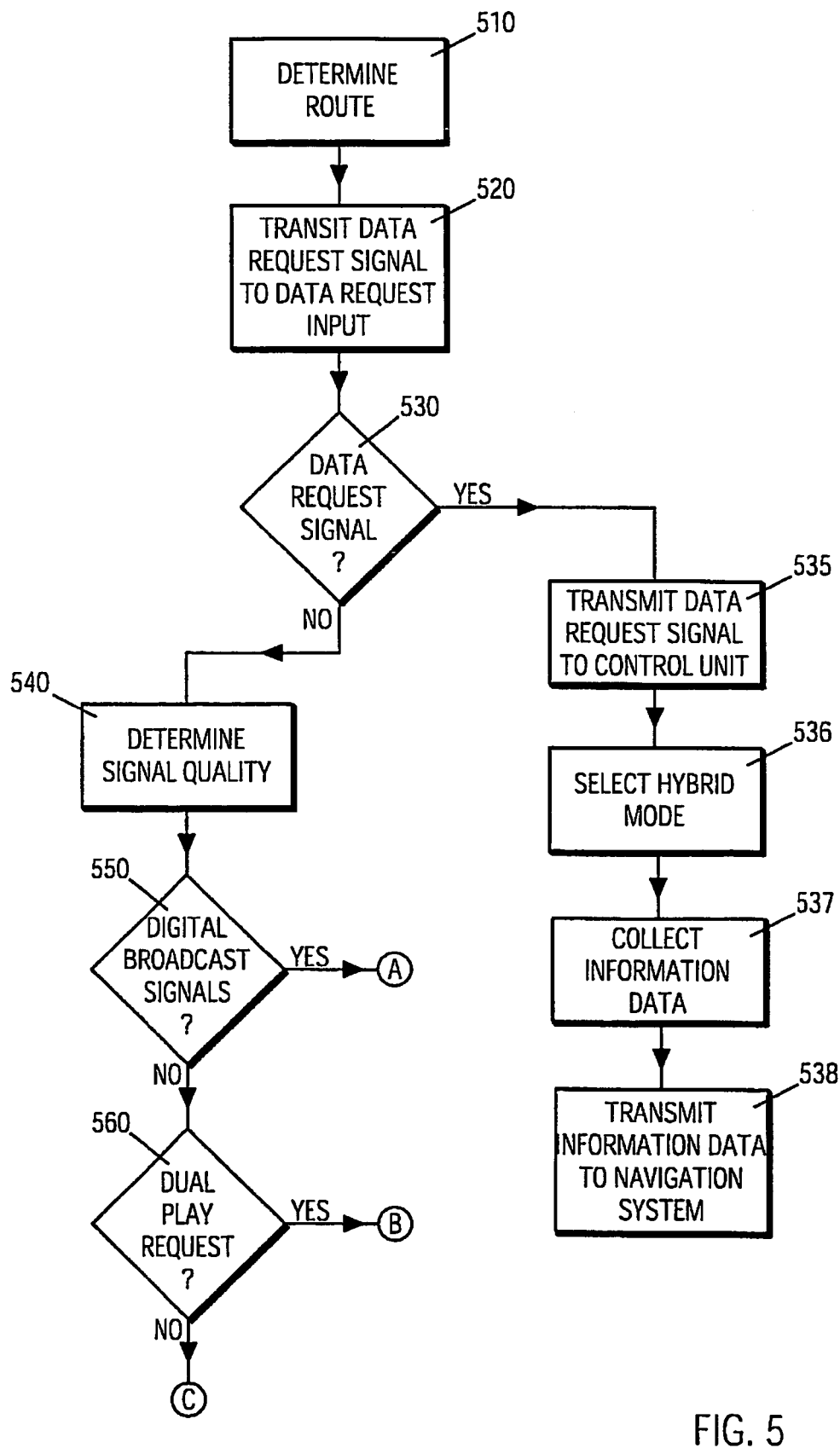
FIG. 5 illustrates another flowchart illustrating another example of a method for choosing an operating mode of a radio system.
Figure 6:
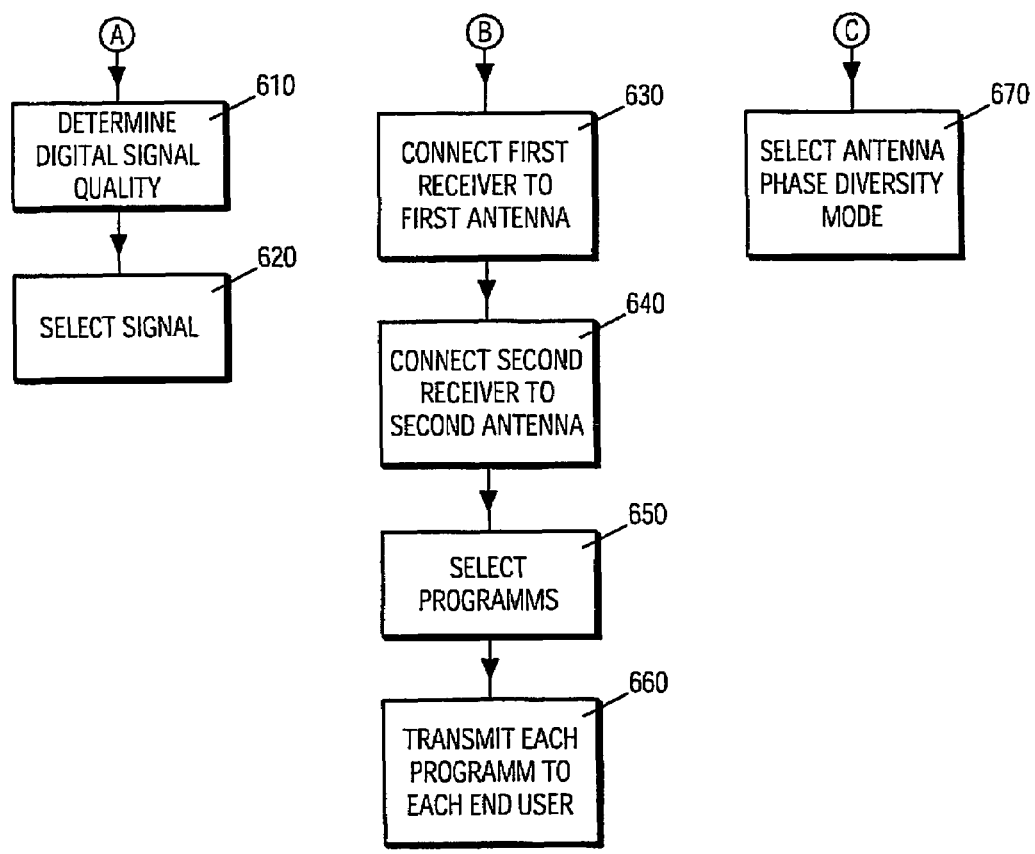
FIG. 6 is the continued flowchart of FIG. 5.

FIGS. 5 & 6 illustrate a more detailed flowchart of an example of an method for selecting the operating mode of a radio system. When the navigation unit determines a route in step 510, the navigation unit may use up-to-date traffic information to calculate the best route. As a consequence, the navigation system transmits a data request signal to the data request input in step 520. In step 530, it is determined whether a data request signal is present at the data request input. If this is the case, the data request signal is transmitted to the control unit in step 535 and the hybrid mode is selected as the operating mode of the radio system in step 536. In this case, the search and scan receiver scans the frequency band and collects additional information data in step 537. The digital add-on information data comprised in the radio signal are decoded and transmitted to the navigation unit in step 538.

If no data request signal can be detected in step 530, the signal quality of the analogously received signal can be determined in step 540. In step 550, it can be asked whether digitally broadcast signals can be received. If this is not the case, it can be asked in step 560 whether a dual play mode is requested.

If it is determined in step 550 that digitally broadcast signals can be received, the signal quality of the digitally broadcast signal can be determined in step 610. In step 620, either the digitally broadcast signal or the analogously broadcast signal is selected in dependence on the received signal quality.

If a dual play mode request is detected in step 560, the first receiver of the two receivers may be connected to the first antenna, and the second receiver may be connected to the second antenna (steps 630 and 640). In step 650, the end user can select the program he or she wants to hear, when in step 660 the first program is provided to the first end user, the second program being provided to the second end user.

If there is no dual play mode request and there have been no digital broadcast signals, the antenna phase diversity mode can be selected in step 670.

In conclusion, a multi-mode radio system is provided that can select the operating mode in accordance with different situations. When a navigation system needs additional information data, the radio system can react accordingly and can be operated in such a way that as many additional information data are provided as possible in the hybrid mode. Furthermore, many other operating modes can be selected in accordance with different situations, each operating mode being best for one special situation.

Persons skilled in the art will understand and appreciate that one or more processes, sub-processes, or process steps described in connection with FIGS. 4-6 may be performed by hardware and/or software. Any software implementations may be executed within a processor or plurality of processor. Examples of a processor include but are not limited to microprocessor, general purpose processor, combination of processors, DSP, any logic or decision processing unit regardless of method of operation, instructions execution/system/apparatus/device and/or ASIC. If the process is performed by software, the software may reside in software memory (not shown) in the device used to execute the software. The software in software memory may include an ordered listing of executable instructions for implementing logical functions (i.e., "logic" that may be implemented either in digital form such as digital circuitry or source code or optical circuitry or chemical or biochemical in analog form such as analog circuitry or an analog source such an analog electrical, sound or video signal), and may selectively be embodied in any signal-bearing (such as a machine-readable and/or computer-readable) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "machine-readable medium," "computer-readable medium," and/or "signal-bearing medium" (herein known as a "signal-bearing medium") is any means that may contain, store, communicate, propagate, or transport the program for use by or in connection with the instruction execution system, apparatus, or device. The signal-bearing medium may selectively be, for example but not limited to, an electronic, magnetic, optical, electromagnetic, infrared, or semiconductor system, apparatus, device, air, water, or propagation medium. More specific examples, but nonetheless a non-exhaustive list, of computer-readable media would include the following: an electrical connection (electronic) having one or more wires; a portable computer diskette (magnetic); a RAM (electronic); a read-only memory "ROM" (electronic); an erasable programmable read-only memory (EPROM or Flash memory) (electronic); an optical fiber (optical); and a portable compact disc read-only memory "CDROM" "DVD" (optical). Note that the computer-readable medium may even be paper or another suitable medium upon which the program is printed, as the program can be electronically captured, via, for instance, optical scanning of the paper or other medium, then compiled, interpreted or otherwise processed in a suitable manner if necessary, and then stored in a computer memory. Additionally, it is appreciated by those skilled in the art that a signal-bearing medium may include carrier wave signals on propagated signals in telecommunication and/or network distributed systems. These propagated signals may be computer (i.e., machine) data signals embodied in the carrier wave signal. The computer/machine data signals may include data or software that is transported or interacts with the carrier wave signal.

It will be apparent to those of ordinary skill in the art that many more implementations are possible within the scope of this invention than those set forth above. The foregoing description of an implementation has been presented for purposes of illustration and description. It is not exhaustive and does not limit the claimed inventions to the precise form disclosed. Modifications and variations are possible in light of the above description or may be acquired from practicing the invention. For example, the described implementation includes software but the invention may be implemented as a combination of hardware and software or in hardware alone. Note also that the implementation may vary between systems. The claims and their equivalents define the scope of the invention.

What is claimed is:

1. A radio system for receiving broadcast signals, the radio system comprising:
    at least two antennas picking up radio signals;
    at least two signal receivers receiving the radio signals, where the two antennas and the two receivers operate in a plurality of diversity operating modes;
    an antenna switching unit for building a connection between the at least two receivers and the at least two antennas;
    a control unit for controlling the antenna switching unit and selecting the diversity operating mode; and
    a connection to a navigation unit to receive an information data request signal from the navigation unit, the control unit being configured to select from at least one diversity operating mode that enables reception of radio signals encoded with information data, the control unit being configured to receive the information data and to transmit the information data to the navigation unit.

2. The radio system of claim 1 comprising:
    a signal verification unit to verify signal quality of the received radio signals, where the control unit selects the diversity operating mode based in part on the signal quality and on the received information data request signal.

3. The radio system of claim 1 where the plurality of operating modes includes any of a group of modes consisting of a hybrid mode, an antenna phase diversity mode, a dual play mode and a system diversity mode.

4. The radio system of claim 3 where:
    the control unit is configured to select the hybrid mode when the information data request signal is received; and
    one of the at least two receives is configured to operate as a search and scan receiver and to search for information data in the received radio signals for transmission to the navigation unit.

5. The radio system of claim 1 where the at least two signal receivers are FM receivers, the radio system further comprising:
    a digital radio receiver coupled to a digital radio antenna to receive digitally broadcast signals; and
    a search unit to check whether digitally broadcast signals can be received.

6. The radio system of claim 1 where the at least two signal receivers are FM receivers, the radio system further comprising:
    an AM radio receiver coupled to one of the at least two antennas.

7. A method for controlling a radio system for receiving broadcast signals, the method comprising:
    receiving radio signals at a first and second antenna connected to a first and second receiver operating in diversity operating modes selected according to a determined diversity control criterion;
    receiving an information data request from a navigation unit;
    controlling the first and second receivers to operate in an operating mode that enables decoding of information data in the radio signals.

8. The method of claim 7 further comprising:

decoding the information data in the radio signals; and transmitting the decoded information data to the navigation unit.

9. The method of claim 8 further comprising:

using the decoded information data to calculate a best route for a vehicle.

10. The method of claim 7 where the step of controlling the first and second receivers includes:

determining the diversity control criterion; and based on the diversity control criterion, selecting the diversity operating mode from a group of diversity operating modes consisting of a hybrid mode, an antenna phase diversity mode, a dual play mode and a system diversity mode.

11. The method of claim 7 further comprising:

verifying signal quality of the radio signals received by each of the first and second receivers; and using the verified signal quality as the diversity control criterion for selecting one of the diversity operating modes.

12. The method of claim 11 where the step of controlling the first and second receivers to operate in an operating mode that enables decoding of information data in the radio signals includes:

configuring the first and second receivers to operate in the hybrid mode, one receiver being a search and scan receiver; and configuring the search and scan receiver in the hybrid mode to search for radio signals containing the information data, and to receive the information data containing radio signals.

13. The method of claim 7 where the two signal receivers are FM receivers, the method further comprising:

receiving digitally broadcast signals at a digital radio receiver coupled to a digital radio antenna; and controlling the digital radio receiver to operate according to at least one of the diversity operating modes.

14. The method of claim 7 where the two signal receivers are FM receivers, the method further comprising:

receiving AM radio signals at an AM radio receiver coupled to one of the first and second antennas; and controlling the AM radio receiver to operate according to at least one of the diversity operating modes.

* * * * *

UNITED STATES PATENT AND TRADEMARK OFFICE
CERTIFICATE OF CORRECTION

PATENT NO.        : 7,676,202 B2
APPLICATION NO.   : 11/280968
DATED             : March 9, 2010
INVENTOR(S)       : Karl Anton-Becker It is certified that error appears in the above-identified patent and that said Letters Patent is hereby corrected as shown below:

In FIG. 2, reference numeral "180" should be changed to reference numeral "280."
At column 1, line 27, "...operating modus..." should be changed to "...operating modes..."
At column 2, line 18, "...surround environment..." should be changed to "...surrounding environment..."
At column 2, line 36, "...according to predetermined diversity control criterion" should be changed to "...according to a predetermined diversity control criterion."
At column 3, line 51, "...antennas..." should be changed to "...antennas 110 or 120..."
At column 3, line 67, "...the receivers" should be changed to "...the receivers 130, 135."
At column 4, line 17, "...whiles the second..." should be changed to "...while the second..."
At column 5, line 54, "...antenna having..." should be changed to "...antenna 110 or 120 having..."
At column 6, line 15, "...the antenna having..." should be changed to "...the antenna 110 or 120 having..."
At column 6, line 16, "The receiver 210 has still..." should be changed to "The receiver 210 still has..."
At column 6, line 17, "...the antenna being..." should be changed to "...the antenna 110 or 120 being..."
At column 8, line 8, "...the navigation unit..." should be changed to "...the navigation unit 170..."
At column 8, line 10, "...the control unit. The control unit..." should be changed to "...the control unit 180. The control unit 180..."
At column 8, line 25, "...the navigation unit" should be changed to "...the navigation unit 170."
At column 9, line 9, "...plurality of processor" should be changed to "...plurality of processors."
In Claim 1, column 10, line 14, "...the two antennas and the two receivers..." should be changed to "...the at least two antennas and the at least two receivers..."
In Claim 4, column 10, line 41, "...the at least two receives..." should be changed to "...the at least two receivers..."
In Claim 7, column 10, line 64, "...unit;" should be changed to "...unit; and".

Signed and Sealed this
Twenty-sixth Day of June, 2012

David J. Kappos
*Director of the United States Patent and Trademark Office*